United States Patent
Tan et al.

(10) Patent No.: US 12,285,722 B2
(45) Date of Patent: Apr. 29, 2025

(54) CONTROL METHOD OF CONTROL SYSTEM FOR CONTROLLING WATER PURIFICATION MODULE

(71) Applicants: Kemflo (Nanjing) Environmental Technology Co., Ltd., Jiangsu (CN); KEMFLO INTERNATIONAL CO., LTD., Pingtung (TW); Ching-Hsiung Lin, Pingtung (TW)

(72) Inventors: Yu Tan, Jiangsu (CN); Hao Zhang, Jiangsu (CN); Evan Zhou, Jiangsu (CN); Edison Fan, Jiangsu (CN)

(73) Assignees: KEMFLO (NANJING) ENVIRONMENTAL TECHNOLOGY CO., LTD., Nanjing (CN); KEMFLO INTERNATIONAL CO., LTD., Pingtung (TW); Ching-Hsiung Lin, Pingtung (TW)

( * ) Notice: Subject to any disclaimer, the term of this patent is extended or adjusted under 35 U.S.C. 154(b) by 712 days.

(21) Appl. No.: 17/541,756

(22) Filed: Dec. 3, 2021

(65) Prior Publication Data
US 2023/0097477 A1   Mar. 30, 2023

(30) Foreign Application Priority Data
Sep. 29, 2021   (CN) .......................... 202122376636.4

(51) Int. Cl.
*B01D 61/12*   (2006.01)
*B01D 61/02*   (2006.01)
(Continued)

(52) U.S. Cl.
CPC .......... *B01D 61/12* (2013.01); *B01D 61/025* (2013.01); *B01D 61/04* (2013.01); *B01D 61/10* (2013.01);
(Continued)

(58) Field of Classification Search
CPC .... B01D 61/025; B01D 61/04; B01D 61/081; B01D 61/10; B01D 61/12; B01D 61/58;
(Continued)

(56) References Cited

U.S. PATENT DOCUMENTS

| 6,290,856 B1 * | 9/2001 | Beall ...................... B01D 61/10 210/764 |
| 6,558,537 B1 * | 5/2003 | Herrington ............ B01D 65/08 210/323.1 |

(Continued)

*Primary Examiner* — Patrick Orme
(74) *Attorney, Agent, or Firm* — RABIN & BERDO, P.C.

(57) ABSTRACT

A control method of a control system for controlling water purification module for processing water on two sides of a reverse osmosis membrane. The control system has a water purification module and a control module. The water purification module has a preliminary filter and a reverse osmosis filter. The control module regularly controls the purification and the drainage of the water purification module, and solves the problem that the TDS value of the water on both sides of the reverse osmosis membrane is too high after the water purifier is on standby for a period of time. The control system regularly drains high concentration water on both sides of the reverse osmosis membrane to improve water purification efficiency.

14 Claims, 2 Drawing Sheets

(51) Int. Cl.
　　　*B01D 61/04*　　　(2006.01)
　　　*B01D 61/10*　　　(2006.01)
　　　*B01D 61/58*　　　(2006.01)
　　　*C02F 1/44*　　　(2023.01)
　　　*C02F 9/20*　　　(2023.01)
　　　*B01D 61/08*　　　(2006.01)
　　　*C02F 103/04*　　　(2006.01)

(52) U.S. Cl.
　　　CPC .............. *B01D 61/58* (2013.01); *C02F 1/441* (2013.01); *C02F 9/20* (2023.01); *B01D 61/081* (2022.08); *B01D 2311/04* (2013.01); *B01D 2311/06* (2013.01); *B01D 2311/08* (2013.01); *B01D 2311/2649* (2013.01); *B01D 2313/18* (2013.01); *B01D 2313/901* (2022.08); *B01D 2313/903* (2022.08); *C02F 2103/04* (2013.01); *C02F 2201/005* (2013.01); *C02F 2209/005* (2013.01); *C02F 2209/10* (2013.01); *C02F 2209/44* (2013.01)

(58) Field of Classification Search
　　　CPC ............ B01D 2311/04; B01D 2311/06; B01D 2311/08; B01D 2311/246; B01D 2311/2649; B01D 2313/18; B01D 2313/901; B01D 2313/903; B01D 2321/02; C02F 1/441; C02F 9/20; C02F 2103/04; C02F 2201/005; C02F 2209/005; C02F 2209/10; C02F 2209/44
　　　See application file for complete search history.

(56) References Cited

U.S. PATENT DOCUMENTS

2007/0256977 A1\* 11/2007 Schmitt ................ B01D 61/025
　　　　　　　　　　　　　　　　　　　　　210/257.2
2021/0268440 A1\* 9/2021 Moon ..................... B67D 1/12

\* cited by examiner

CONTROL METHOD OF CONTROL SYSTEM FOR CONTROLLING WATER PURIFICATION MODULE

BACKGROUND OF THE INVENTION

1. Field of the Invention

The present invention relates to a control method in water purification, especially to a control method of a control system for controlling a water purification module for processing water on two sides of a reverse osmosis membrane.

2. Description of the Prior Arts

Water purifiers have been used in thousands of households, and the high efficiency of water purification is the goal pursued by every manufacturer and user. Since the reverse osmosis water purifiers are special and important in the water purification field, the high concentration environment on both sides of the reverse osmosis membrane has always been the focus of research and development by major manufacturers.

However, although there has been a rinsing and drainage waterway system available on the market, it does not regularly process the high concentration water environment on two sides of the reverse osmosis membrane according to the overall situation of the water purifier, and thus the water purification cannot sustain high efficiency.

To overcome the shortcomings, the present invention provides a control method of a control system for controlling a water purification module for processing water on two sides of a reverse osmosis membrane to mitigate or obviate the aforementioned problems.

SUMMARY OF THE INVENTION

The main objective of the present invention is to provide a control method of a control system for controlling a water purification module wherein the control module is configured to regularly drain the high concentration water on two sides of the reverse osmosis membrane.

The control system for processing water on two sides of a reverse osmosis membrane has a water purification module and a control module. The water purification module has a preliminary filter, a reverse osmosis filter, a clean water flow path, an inlet solenoid valve, a waste water flow path, a waste water solenoid valve, a pure water flow path, a stale water flow path, and an outlet solenoid valve. The reverse osmosis filter is disposed subsequent to the preliminary filter in order. The clean water flow path is mounted between the preliminary filter and the reverse osmosis filter. The inlet solenoid valve is mounted on the clean water flow path. The waste water flow path is mounted on a waste water side of the reverse osmosis filter. An end of the waste water flow path communicates with a waste water outlet. The waste water solenoid valve is mounted on the waste water flow path. The pure water flow path is mounted on a pure water side of the reverse osmosis filter. An end of the pure water flow path communicates with a pure water outlet. The stale water flow path is mounted on the waste water flow path. An end of the stale water flow path communicates with the pure water flow path. Another end of the stale water flow path communicates with the waste water flow path. An outlet solenoid valve is mounted on the stale water flow path. A control module is connected to the water purification module. The method comprises the following acts: when the pure water outlet stops discharging water, the control module immediately controls the water purification module to open the inlet solenoid valve and the waste water solenoid valve to communicate with the clean water flow path, the reverse osmosis filter, and the waste water flow path; when the pure water outlet is closed for a period of time, the control module controls the water purification module to open the inlet solenoid valve and the outlet solenoid valve to communicate with the clean water flow path, the reverse osmosis filter, the stale water flow path, and the waste water flow path; and when the pure water outlet is open, the outlet solenoid valve mounted on the stale water flow path is closed, and the clean water flow path, the reverse osmosis filter, and the pure water flow path communicate with each other.

The control method of a control system for controlling the water purification module for processing water on two sides of a reverse osmosis membrane in accordance with the present invention has the following beneficial effects: the concentration environment on both sides of the reverse osmosis membrane in the reverse osmosis water purifier can be controlled through the control module, thereby improving the utilization of the reverse osmosis membrane.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
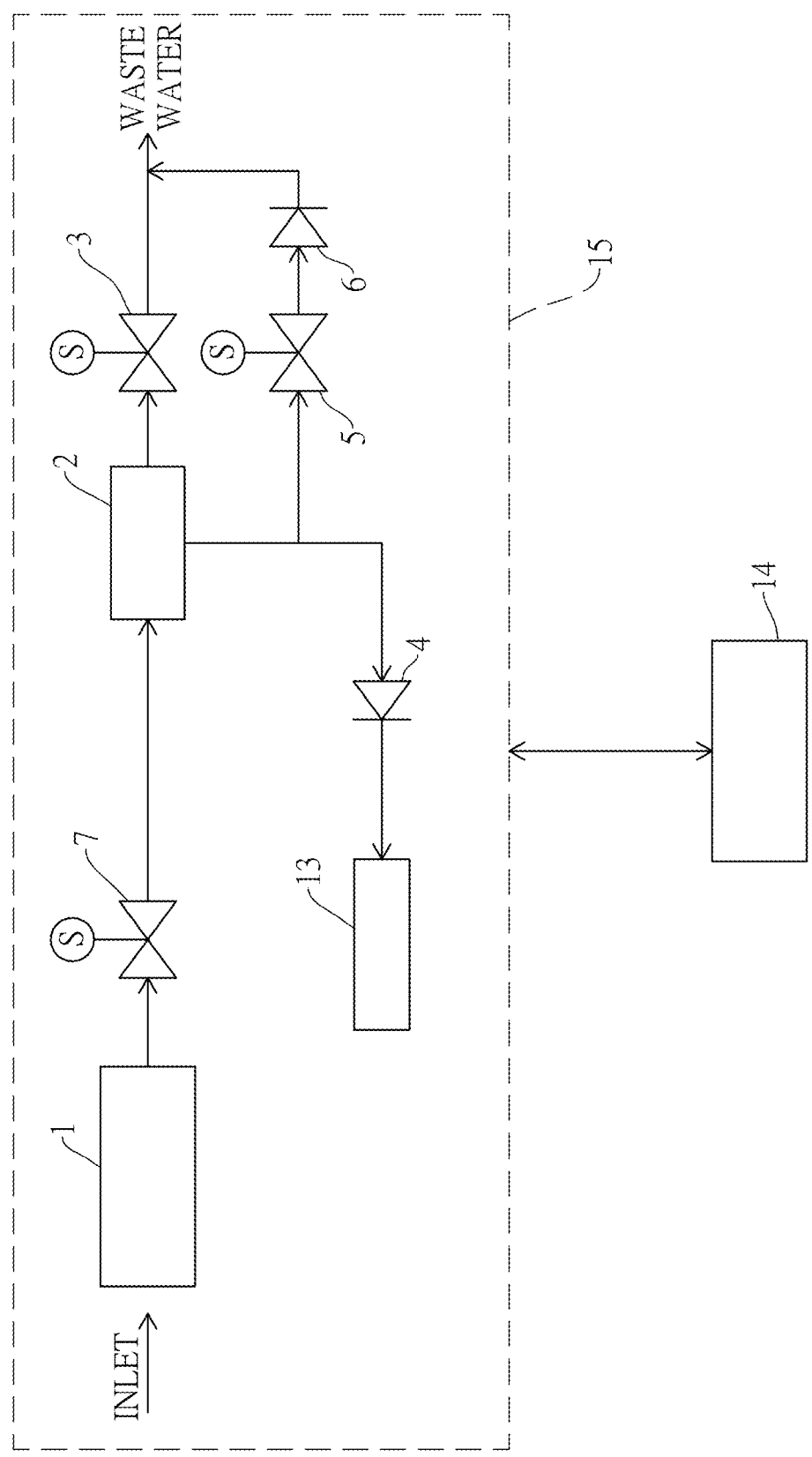
FIG. 1 is a schematic diagram of a water path system of a control system for controlling a water purification module for processing water on two sides of a reverse osmosis membrane in accordance with the present invention, showing the control system implemented without the TDS probe and the posterior filter.

With reference to FIG. 1, in a first embodiment, a control system for controlling a water purification module for processing water on two sides of a reverse osmosis membrane in accordance with the present invention comprises a control module 14 and a water purification module 15. The control module 14 is mounted in front of the water purification module 15 and controls the water purification module 15. The water purification module 15 has a preliminary filter 1 and a reverse osmosis filter 2. The reverse osmosis filter 2 is disposed subsequent to the preliminary filter 1 in order. A clean water flow path is mounted between the preliminary filter 1 and the reverse osmosis filter 2. A pure water flow path and a waste water flow path are mounted on the reverse osmosis filter 2. The pure water flow path is mounted on a pure water side of the reverse osmosis filter 2, and the waste water flow path is mounted on a waste water side of the reverse osmosis filter 2. The pure water flow path is configured to transport pure water, and the waste water flow path is configured to rinse a high concentration clean water environment in front of the reverse osmosis membrane. An end of the pure water flow path communicates with a pure water outlet 13, and an end of the waste water flow path communicates with a waste water outlet.

In practice, a first check valve 4 is mounted on the pure water flow path, and a waste water solenoid valve 3 is mounted on the waste water flow path.

In practice, the pure water flow path of the reverse osmosis filter 2 has a branch path defined as a stale water flow path. An end of the stale water flow path communicates with the pure water flow path, and another end of the stale water flow path communicates with the waste water flow path. An outlet solenoid valve 5 and a check valve 6 are mounted on the stale water flow path. The stale water flow path and the waste water flow path converge at the waste water outlet.

In practice, a faucet is mounted on the pure water outlet 13 of the pure water flow path.

In practice, raw water is filtered by the preliminary filter 1 to produce purified water.

In practice, when the pure water outlet 13 stops discharging water, which means the faucet is closed, the control module 14 immediately controls the inlet solenoid valve 7 and the waste water solenoid valve 3 to open, and then clean water rinses high concentration clean water on a clean water side of the reverse osmosis membrane and the high concentration clean water is drained out from the waste water outlet via the clean water flow path, the reverse osmosis filter, and the waste water flow path. After rinsing for a period of time, the inlet solenoid valve 7 and the waste water solenoid valve 3 are closed. When the machine is on standby for a period of time, which means the pure water outlet or the faucet is closed for a period of time (preferably, but not limited to, two or more than two hours), the control module 14 controls the water purification module to open the inlet solenoid valve 7 and the outlet solenoid valve 5, and then drain out high concentration stale water from the waste water outlet via the clean water flow path, the reverse osmosis filter, and the stale water flow path. After rinsing for a period of time, the outlet solenoid valve 5 is closed, and now a user can close the inlet solenoid valve 7 to stop the machine or open the faucet to obtain pure water. When the pure water outlet 13 is open, which means the faucet is discharging water, the outlet solenoid valve 5 mounted on the stale water flow path is closed, and raw water is filtered by the preliminary filter 1 to produce clean water. The clean water flows from the clean water flow path to the reverse osmosis filter 2 and then flows out from the faucet through the pure water flow path.

In practice, the control module 14 activates the stale water flow path or the waste water flow path automatically by a timer or manually.

Figure 2:
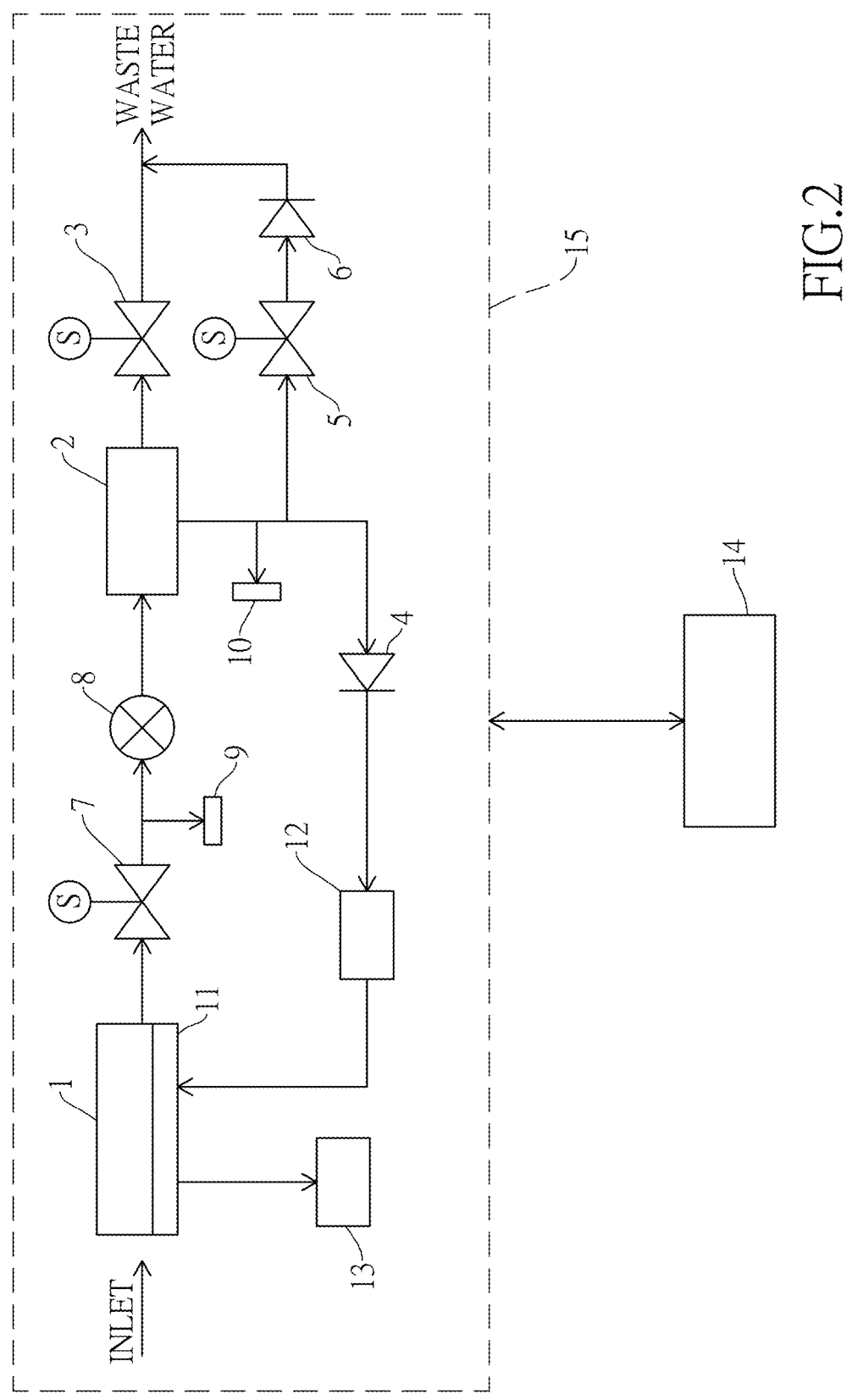
FIG. 2 is another schematic diagram of the water path system of the control system for controlling a water purification module for processing water on two sides of the reverse osmosis membrane in FIG. 1, showing the control system implemented with the TDS probe and the posterior filter.

With reference to FIG. 2, in a second embodiment, a first Total Dissolved Solids (TDS) probe 9 is mounted between the preliminary filter 1 and the reverse osmosis filter 2 to detect the clean water TDS value on the clean water side of the reverse osmosis membrane. A second TDS probe 10 is mounted on the pure water flow path to detect the pure water TDS value on the pure water side of the reverse osmosis membrane.

In practice, a motor 8 can be mounted between the preliminary filter 1 and the reverse osmosis filter 2 to offer pressure for clean water to enter the reverse osmosis filter 2 to be filtered.

In practice, a high pressure switch 12 and a posterior filter 11 are also mounted on the pure water flow path. The posterior filter 11 and the preliminary filter 1 are located in the same filter cylinder.

In practice, raw water is filtered by the preliminary filter 1 of the front and rear composite filters to produce clean water, and then the clean water passes the inlet solenoid valve 7 and enters the reverse osmosis filter 2 by the effect of the motor 8 to be filtered. Pure water passes the first check valve 4 and the high pressure switch 12 and then enters the posterior filter 11 of the front and rear composite filters for final filtering. At last, the pure water flows out from the faucet.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A control method of a control system for controlling a water purification module for processing water on two sides of a reverse osmosis membrane, the control system including:
   the water purification module having
     a preliminary filter;
     a reverse osmosis filter disposed posterior to the preliminary filter;
     a clean water flow path mounted between the preliminary filter and the reverse osmosis filter;
     an inlet solenoid valve mounted on the clean water flow path;
     a waste water flow path mounted on a waste water side of the reverse osmosis filter; an end of the waste water flow path communicating with a waste water outlet;
     a waste water solenoid valve mounted on the waste water flow path;
     a pure water flow path mounted on a pure water side of the reverse osmosis filter; an end of the pure water flow path communicating with a pure water outlet;
     a stale water flow path mounted on the waste water flow path; an end of the stale water flow path communicating with the pure water flow path; another end of the stale water flow path communicating with the waste water flow path; and
     an outlet solenoid valve mounted on the stale water flow path; and
     a control module connected to the water purification module,
   the control method comprising:
     when the pure water outlet stops discharging water, the control module immediately controlling the water purification module opens the inlet solenoid valve and the waste water solenoid valve to communicate with the clean water flow path, the reverse osmosis filter, and the waste water flow path;
     when the pure water outlet is closed for a period of time, the control module controlling the water purification module opens the inlet solenoid valve and the outlet solenoid valve to communicate with the clean water flow path, the reverse osmosis filter, the stale water flow path, and the waste water flow path; and
     when the pure water outlet is open, closing the outlet solenoid valve mounted on the stale water flow path, such that the clean water flow path, the reverse osmosis filter, and the pure water flow path communicate with each other.

2. The control method as claimed in claim 1, wherein two check valves are respectively mounted on the pure water flow path and the stale water flow path.

3. The control method as claimed in claim 2, wherein
a first TDS probe is mounted between the preliminary filter and the reverse osmosis filter; and
a second TDS probe is mounted on the pure water flow path.

4. The control method as claimed in claim 3, wherein a faucet is mounted on the pure water outlet.

5. The control method as claimed in claim 4, wherein
a high pressure switch is mounted on the pure water flow path; and
a posterior filter is mounted on the pure water flow path and located in a same filter cylinder with the preliminary filter.

6. The control method as claimed in claim 5, wherein the control module activates the stale water flow path or the waste water flow path automatically by a timer.

7. The control method as claimed in claim 6, wherein a motor is mounted between the preliminary filter and the reverse osmosis filter.

8. The control method as claimed in claim 7, wherein when the pure water outlet is closed for two hours or more than two hours, the control module controls the water purification module to open the inlet solenoid valve and the outlet solenoid valve.

9. The control method as claimed in claim 1, wherein
a first Total Dissolved Solids (TDS) probe is mounted between the preliminary filter and the reverse osmosis filter; and
a second TDS probe is mounted on the pure water flow path.

10. The control method as claimed in claim 1, wherein a faucet is mounted on the pure water outlet.

11. The control method as claimed in claim 1, wherein
a high pressure switch is mounted on the pure water flow path; and
a posterior filter is mounted on the pure water flow path and located in a same filter cylinder with the preliminary filter.

12. The control method as claimed in claim 1, wherein the control module activates the stale water flow path or the waste water flow path automatically by a timer.

13. The control method as claimed in claim 1, wherein
a motor is mounted between the preliminary filter and the reverse osmosis filter.

14. The control method as claimed in claim 1, wherein when the pure water outlet is closed for two hours or more than two hours, the control module controls the water purification module to open the inlet solenoid valve and the outlet solenoid valve.

* * * * *